Feb. 9, 1926.  1,572,760
R. R. ARNAU
OPTICAL DEVICE
Filed Nov. 17, 1921  2 Sheets-Sheet 1
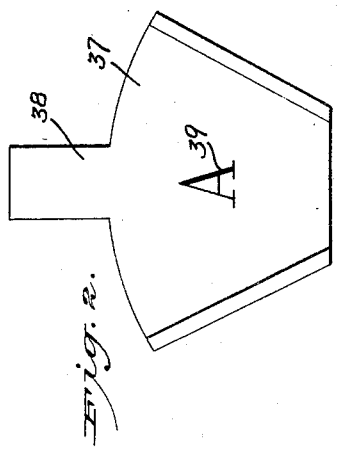
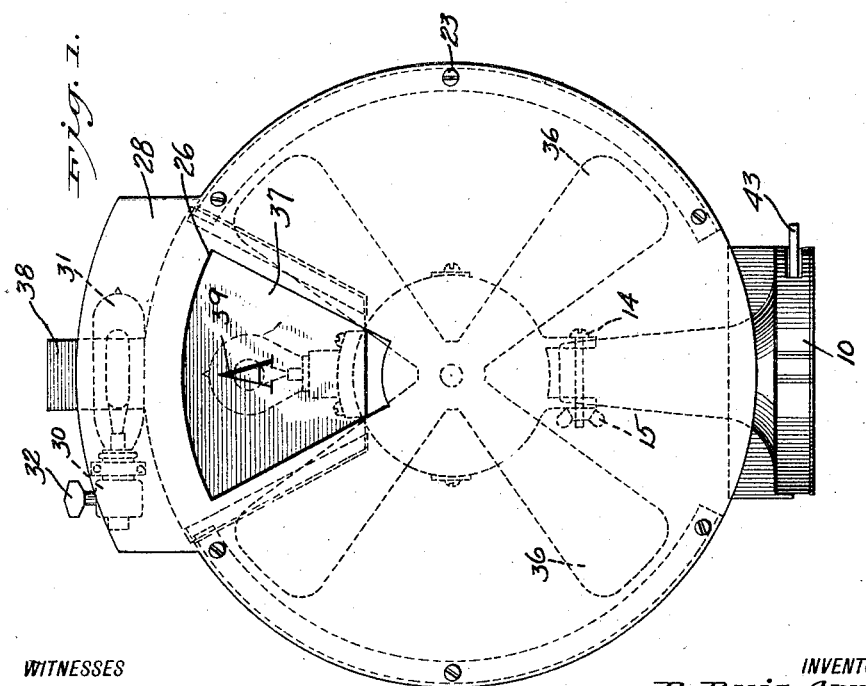
WITNESSES
INVENTOR
R. Ruiz Arnau
BY
ATTORNEYS Feb. 9, 1926.
R. R. ARNAU
1,572,760
OPTICAL DEVICE
Filed Nov. 17, 1921    2 Sheets-Sheet 2
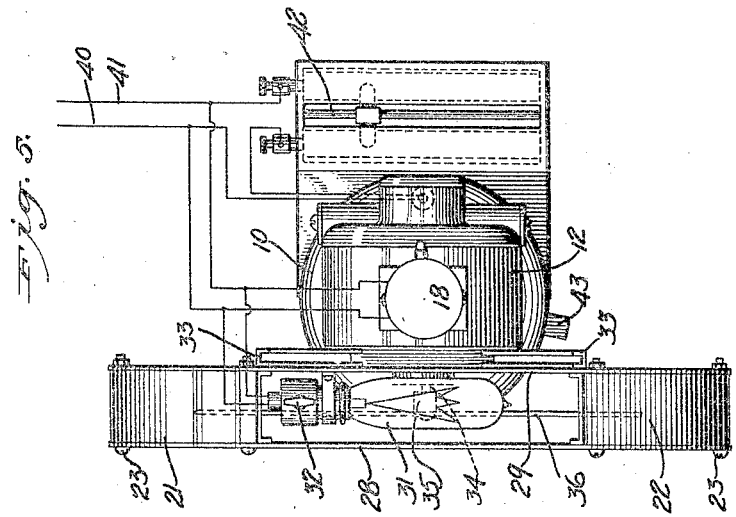
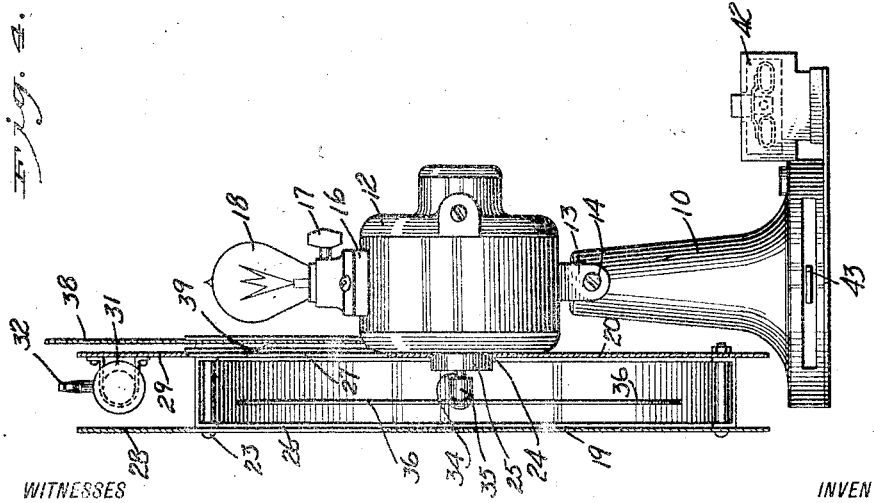

Patented Feb. 9, 1926.

1,572,760

UNITED STATES PATENT OFFICE.

RAMÓN RUIZ ARNAU, OF SAN JUAN, PORTO RICO.

OPTICAL DEVICE.

Application filed November 17, 1921. Serial No. 515,879.

*To all whom it may concern:*

Be it known that I, RAMÓN RUIZ ARNAU, a citizen of the United States, and a resident of San Juan, in Porto Rico, but temporarily residing in the city of New York, borough of Manhattan, in the county and State of New York, have invented new and useful Improvements in Optical Devices, of which the following is a full, clear, and exact description.

This invention relates to optical devices primarily designed for the treatment of the eyes to restore normal vision. It has been discovered that the normal eye cannot see perfectly the same point or part of an object except for a very short period of time; a fraction of a second. If a person tries to stare at the point or object for a longer period than this the image at once loses its clearness of outline and the individual sometimes experiences a sensation of discomfort and even of pain. This always occurs in the case of individuals with permanently defective eyesight, that is, with an error of refraction. In normal sight the shifting of the point required is an absolutely unconscious phenomenon. At a distance of ten or fifteen feet in a dim light the normal eye must take four shiftings in order to recognize one of the letters in the last line of the Snellen test card. It is only when one can shift with this speed that the eye and the mind function without strain with their maximum efficiency, and the shorter and more frequent the unconscious shifting the better the sight. On the other hand, the defective eye attempts the impossible when it tries to stare at the same point for an appreciable length of time, and all that it accomplishes in the end is to increase the defect of refraction.

In the case of abnormal vision if the patient succeeds in making an adequate conscious shifting he will experience a feeling of rest in the eyes and a temporary diminution of the error of refraction. The practice of conscious shifting will lead first to a temporary improvement and later to a permanent cure of the defect in a period of time proportioned to the individual's capacity for mental relaxation.

The general object of this invention is the provision of means for training the eyes in unconscious shifting.

A further object is the provision of a device to demonstrate the principle of shifting in physiology and for proving to a patient the benefit derived from the practice of shifting.

These and other objects of the invention will be more clearly understood from the following detailed description and accompanying drawings.

Figure 1 is a front elevation of the optical device;

Figure 2 is a plan view of a slide for use with the optical device;

Figure 3 is a top plan view of the slide shown in Figure 2;

Figure 4 is a side elevation of the optical device;

Figure 5 is a plan view of the optical device showing the diagram of the electrical connections.

Referring to the above mentioned figures, a stand 10 is provided on which a motor 12 is mounted by means of lugs 13 which are integral with the motor casing. These lugs 13 are attached to the stand 10 by means of a bolt 14 provided with a wing nut 15 for clamping the lugs tightly so as to hold the motor in any desired position to which it has been rotated about the axis of the bolt. An electric bulb socket 16 is mounted on the casing 12 and is provided with a key 17 which serves as a means for connecting the terminals of the electric bulb 18 across the supply circuit.

Two circular plates 19 and 20, spaced apart by means of arc-shaped channel members 21 and 22, are held together by means of bolts 23 which extend through the plates and the arc-shaped channel. The arc-shaped channel members extend only through an angle of about 120° on either side of the circular plates 19 and 20. The plate 20 has a circular opening 24 cut in its center. This opening fits over the motor casing hub 25 and the plate is secured to the motor casing. Openings 26 and 27 which are the shape of a sector of a hollow circle are cut from the plates 19 and 20, respectively. These openings are preferably located near the top of the plates in alinement with one another and with the lamp 18. Two arc-shaped extensions 28 and 29 extend upward from the plates 19 and 20, respectively, and on the extension 29 an electric bulb socket 30 is mounted and serves to carry an electric bulb 31. The light socket 30 is provided with a key 32 for connecting the electric light bulb 31 across the circuit mains.

The extension 28 projects high enough to obstruct a view of the electric light bulb 31 from a position in front of the optical device. Attached to the back of plate 20 is a guide 33 extending on each side of the opening 27. The axle of the shaft 34 of the motor extends into the space between the plates 19 and 20. A hub 35 is fixed to this shaft and carries a plurality of blades 36 which are approximately the shape of a sector of a circle. These blades are flat and mounted parallel to the plates 19 and 20 and extend through an angle smaller than the angle of the openings 26 and 27.

Slides 37, which are the shape of the openings 26 and 27 and of proper size, fit into the guide 33 to close the opening 27. These slides have an extension 38 which serves as a means for drawing them from the guide. The surface of these slides is white and a black letter 39 is painted in the center. These letters are made of different sizes.

In order to give a better light effect the back of the blades 36 and the back of the front plate 19 are painted white, while the front face of the blades and the front of the back plate as well as the whole exterior of the apparatus are an intense black. An additional advantage of this system of painting is that the frequent visualizing of the machine, taken as a familiar object and especially if it is remembered in motion, should become a great help in acquiring relaxation of the eyes.

The electric light bulbs and the motor are connected in parallel to the supply means 40 and 41. In the motor circuit a rheostat 42 of ordinarily construction is inserted so as to control the voltage supplied to the motor in order to regulate the speed. There being nothing novel in the particular construction of the rheostat it is not set forth in detail. A switch 43 is also supplied in conjunction with the motor in order to disconnect the motor windings from the motor circuit.

When it is desired to use the optical device for demonstrating the principle of shifting, the patient is placed in front of the machine and the plates 19 and 20 adjusted to a position at right angles to the line of vision by revolving the motor about the axis of the bolt 14. Then if it is desired to use the bulb 18 it is lighted by means of the key 17, while if it is thought advisable to use the letters on the slides 37, a slide is placed in the guide 33 and the bulb 31 lighted by means of the key 32. In the latter case the light 18 is turned off. After preparing the proper background, which is either the light 18 or the slide 37, the motor is set in motion by means of the switch 43. The speed of the motor is controlled by means of the rheostat 42. As the blades 36 rotate, the object in the background appears and disappears alternately. If the rotation is slow, the passage of each blade 36 is seen through the opening 26 and then the visioning of the object in the background is plainly discontinuous; the bulb 18 or the letter 39 on the slide 37. But if the revolutions are rapid enough the blades 36 are no longer visible and one has the sensation of seeing the details through the openings clearly as if the blades were not in motion. The accelerated motion, however, does not change the fact, though the observer is unconscious of it, that in reality the objects situated on the other side of the blades 36 are alternately seen and not seen with a certain rapidity, a condition which of necessity produces the result that the point gazed at changes rapidly, continuously and rhythmically, thus fulfilling the exact conditions necessary for the principle of shifting the normal eye.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

I claim:

1. As a new article of manufacture a device of the class described comprising a pair of spaced plates, an opening cut in each plate and located in alignment with one another, a guide attached to the back of the back plate, a slide having a configuration marked thereon for mounting in the guide and closing the back plate opening, a light mounted between the plates for illuminating the slide, and means for intermittently intercepting the rays of light reflected from the slide and passing through the opening in the front plate.

2. A device of the class described comprising a stand having a motor mounted thereon, a pair of spaced plates fixed to the motor casing, an opening the shape of the sector of a circle cut in each plate and so located as to be in alignment, a guide mounted on the back plate, a slide having a letter marked thereon mounted in said guide, a light located between said spaced plates for illuminating said slide, and means in conjunction with the motor for intermittently interrupting the light rays reflected from the slide in the direction of the opening in the front plate of said spaced plates.

3. A device of the class described comprising a stand having a motor mounted thereon, a pair of spaced plates each having an opening the shape of the sector of a circle cut therein removably attached to the motor casing, said openings being in alignment with one another, a guide mounted on the back plate adjacent the opening, a slide adapted to fit into said guide to close the opening in the back plate, a light mounted between the plates to illuminate the slide, means for intermittently intercepting the rays of light reflected from the slide in the direction of the opening in the front plate, and means for varying the angle the spaced plates make with a horizontal plane.

4. A device of the class described comprising a stand having a motor mounted thereon, a pair of spaced plates, having an opening the shape of the sector of a circle cut in each, fixed to the motor casing, said openings being in alignment with one another, a number of sector-shaped blades mounted on an extension of the motor shaft, a guide fixed to the back plate along the sides of the opening therein, a slide having a letter marked thereon for mounting in said guide to close the opening in the back plate, the back surfaces of said blades and said front plate and the front surface of said slide being colored white while the front surfaces of said plates and blades are black, an electric light bulb positioned to illuminate said slide when in said guide means in conjunction with said motor for controlling its speed, and a source of electrical energy for operating the motor and the electric light bulb.

5. A device for treating the eyes, comprising an object to be gazed upon, an apertured screen for mounting in front of said object with the aperture in alignment with the object to be gazed upon, means for illuminating the object to be gazed upon, and an object movably mounted between said screen and the object to be gazed upon for intermittently screening from view the object to be gazed upon.

RAMÓN RUIZ ARNAU.